United States Patent

Wu et al.

Patent Number: 5,741,837
Date of Patent: Apr. 21, 1998

[54] SYNDIOTACTIC POLYSTYRENE COMPOSITION WITH IMPROVED CRYSTALLIZATION RATE

[75] Inventors: Chung-Jen Wu, Tainan; Chien-Ming Chen, Taoyuang Hsien; Hsien-Ming Chen; Hurng-Rern Lee, both of Hsinchu, all of Taiwan

[73] Assignee: Industrial Technology Research Institute, Hsinchu, Taiwan

[21] Appl. No.: 825,235

[22] Filed: Mar. 27, 1997

[51] Int. Cl.$^6$ .................................................. C08K 5/34
[52] U.S. Cl. ........................ 524/87; 524/92; 524/93; 524/94; 524/104; 524/106; 524/486
[58] Field of Search ........................ 524/87, 92, 93, 524/94, 104, 106, 486

[56] References Cited

U.S. PATENT DOCUMENTS 5,034,441  7/1991  Nakano et al. ................ 524/117
5,156,797  10/1992  Yamasaki et al. .............. 254/518

*Primary Examiner*—Edward J. Cain
*Attorney, Agent, or Firm*—W. Wayne Liauh

[57] ABSTRACT

A syndiotactic polystyrene composition is improved which exhibits improved crystallization rate. The improved syndiotactic polystyrene composition contains (a) a syndiotactic polystyrene; and (b) a nucleating agent which is selected from the group consisting of two types of compounds represented by the following formulas, respectively:

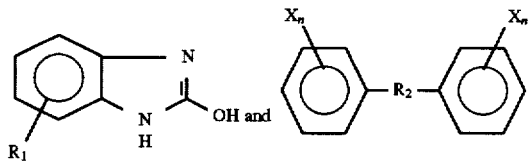

In Formulas I and II, the radicals $R_1$ and $R_2$, which can be the same of different, are $C_1$ to $C_5$ alkyl groups. X is a halogen group, preferably a bromide group, and n is an integer from 1 to 5. In the present invention, the nucleating agent is provided at 0.01 to 5 part, by weight, per 100 parts, also by weight, of the syndiotactic polystyrene resin. An example of Formula I compound is 2-hydroxybenimidiazole, and an example of the Formula II compound is bis(phenylbromide) methane.

10 Claims, No Drawings

SYNDIOTACTIC POLYSTYRENE COMPOSITION WITH IMPROVED CRYSTALLIZATION RATE

FIELD OF THE INVENTION

The present invention relates to a syndiotactic polystyrene composition with improved crystallization rate. More specifically, the present invention relates to a syndiotactic polystyrene composition, which contains a syndiotactic polystyrene and a nucleating agent, so as provide accelerated rate of crystallization and allow the polystyrene polymer to be advantageously processed at reduced temperatures.

BACKGROUND OF THE INVENTION

Conventionally, polystyrenes are typically prepared using free-radical polymerization processes, and the polystyrenes so produced are highly non-crystalline. The non-crystalline polystyrenes can be molded using a variety of conventional techniques, such as injection molding, extrusion, blow molding, etc, to form various household goods, toys, packaging containers, furniture, synthetic paper, as well as many other industrial goods. Because of their lack of crystallinity, the conventional non-crystalline polystyrenes do not provide desired mechanical strength, heat-resistance, or chemical-resistance.

In a contrast to the non-crystalline polystyrenes, syndiotactic polystyrenes have been developed which exhibited high crystallinity. While crystallinity can also be exhibited by isotactic polystyrenes, these two types of polymers are different in many characteristics. One of the main advantages of the highly crystalline syndiotactic polystyrenes is that they possess a melting point as high as 270° C. The highly crystalline syndiotactic polystyrenes also exhibit many other advantageous properties relative to the conventional polystyrenes including the isotactic polystyrenes. Discussion of syndiotactic polystyrenes can be found in a number of literatures, including Japan Laid-Open Patent Applications JP-62104818, JP-62257948, and JP-62267950, etc. These references are incorporated by reference.

One of the drawbacks of the highly crystalline syndiotactic polystyrenes, however, is that they typically exhibit relatively slow crystallization rate. As a result, relatively high processing temperatures are required for the highly crystalline syndiotactic polystyrenes in order to achieve acceptable crystallization rate.

Several methods have been proposed in the prior art references to improve the crystallization rate of highly crystalline syndiotactic polystyrenes. In JP-01201350, it was proposed using metal organic phosphate salts as a nucleating agent to improve the rate of crystallization. European Patent Application EP-312976 proposed a mixture composition, which contains an organic metal salt (<50 μm), an inorganic compound (<50 μm), an organic phosphate and inomer, as a nucleating agent. JP-06340786 disclosed the use of a nucleating agent/crystallization aid which contained an organic alkali metal salt and cyclic phosphate ester. In JP-07247390, it was disclosed using halogenated bisphtholimide as a nucleating agent.

To the inventors' best knowledge, none of the above mentioned methods has been commercially exploited. Also, in the chemical industry, it is always desirable to develop alternative processes or compositions, because one or more of these alternative processes or compositions may turn out to be more cost-effective, or provide other advantageous characteristics. On the other hand, history has taught that, it may be too late to attempt to develop the alternative processes or compositions, should the current technology prove to cause any potential health hazzard, or become otherwise environmentally incompatible.

SUMMARY OF THE INVENTION

The primary object of the present invention is to develop a syndiotactic polystyrene composition with improved crystallization rate. More specifically, the primary object of the present invention is to develop a syndiotactic polystyrene composition, which contains a syndiotactic polystyrene and a nucleating agent, for improved crystallization rate. The nucleating agent of the present invention is selected such that it is compatible with the highly crystalline syndiotactic polystyrene and provides accelerated rate of crystallization so as to advantageously allow the polystyrene polymer to be processed at reduced temperatures.

The syndiotactic polystyrene composition disclosed in the present invention comprises:

(a) a syndiotactic polystyrene; and (b) a nucleating agent which is selected from the group consisting of two types of compounds represented by the following formulas, respectively:

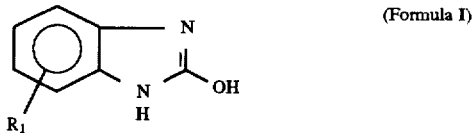 (Formula I)

and

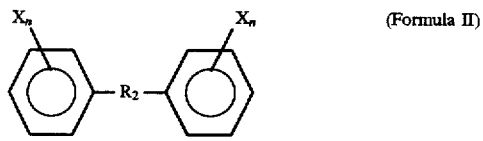 (Formula II)

wherein $R_1$ and $R_2$ are, independently, $C_1$ to $C_5$ alkyl groups, X is a halogen group, preferably a bromide group, and n is an integer from 1 to 5;

(c) further wherein said nucleating agent is provided at 0.01 to 5 part, by weight, per 100 parts, by weight, of said syndiotactic polystyrene.

An example of Formula I compound for practicing the present invention is hydroxybenimidiazole, and an example of the Formula II compound is bis(phenylbromide) methane.

In the present invention, the term polystyrene includes non-substituted as well as substituted polystyrenes. Examples of the polystyrene resins suitable for practicing the present invention include the (un-substituted) polystyrene itself, poly(alkylstyrene), poly(halogenated styrene), poly(alkoxystyrene), poly(styrenebenzoate), or copolymers thereof. The key element is that they must be syndiotactic polymers. Preferred examples of poly(alkylstyrene) include poly(methylstyrene), poly(ethylstyrene), poly (isopropylstyrene). Preferred examples of poly(halogenated styrene) include poly(bromostyrene) and poly (chlorostyrene). Preferred examples of poly(alkoxystyrene) include poly(methoxystyrene) and poly(ethoxystyrene).

The most preferred syndiotactic polystyrenes are the un-substituted polystyrene, poly(p-methylstyrene), poly(m-methylstyrene), poly(p-ter-butylstyrene), poly(p-chlorostyrene), and copolymers of styrene and p-methylstyrene. All these polymers, of course, must have high syndiotacticity.

In the present invention, the nucleating agent and the syndiotactic polystyrene resin can be mixed according to a variety of known methods. For example, the polystyrene resin can be provided in the form of powder or pellets; it is then mixed with the nucleating agent provided in a powder form. Alternatively, the nucleating agent can be initially provided as a concentrated form, and then it is diluted with the polystyrene resin bulk during use. The improved syndiotactic polystyrene composition of the present invention can also be processed utilizing a variety of known techniques, such as extrusion molding, injection molding, vacuum molding, cross-linking foaming, etc. to produce a variety of products, such as fibers, biaxial extension films, thin plates, etc. in addition to molded products. Because of the excellent mechanical and chemical properties of the syndiotactic polystyrenes, the product of the present invention can be most advantageously used in making high-value-added products such as electronic components and composite materials.

DETAILED DESCRIPTION OF THE PREFERRED EMBODIMENT

The present invention discloses a syndiotactic polystyrene composition with improved crystallization rate. In the present invention, an improved syndiotactic polystyrene composition is disclosed which contains a syndiotactic polystyrene and a nucleating agent. The nucleating agent of the present invention is selected such that it is compatible with the highly crystalline syndiotactic polystyrene and effectuates an accelerated rate of crystallization, so as to advantageously allow the polystyrene polymer to be processed at reduced temperatures.

The syndiotactic polystyrene composition disclosed in the present invention comprises:

(a) a syndiotactic polystyrene; and (b) a nucleating agent which is selected from the group consisting of two types of compounds represented by the following formulas, respectively:

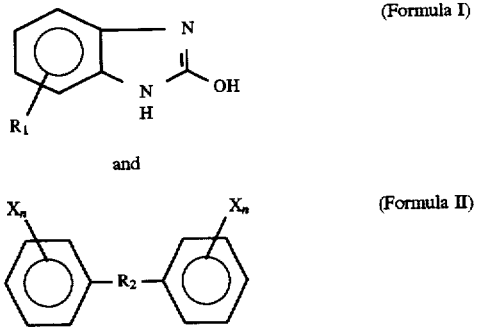

In Formulas I and II, the radicals $R_1$ and $R_2$, which can be the same of different, are $C_1$ to $C_5$ alkyl groups, X is a halogen group, preferably a bromide group, and n is an integer from 1 to 5. In the present invention, the nucleating agent is provided at 0.01 to 5 part, by weight, per 100 parts, also by weight, of the syndiotactic polystyrene.

An example of Formula I compound for practicing the present invention is 2-hydroxybenimidiazole, and an example of the Formula II compound is bis(phenylbromide) methane, or methyldibenzenic bromide.

As discussed above, the term polystyrene used in the present invention includes non-substituted as well as substituted polystyrenes. Preferably, the polystyrene resin is the un-substituted polystyrene itself, poly(alkylstyrene), poly(halogenated styrene), poly(alkoxystyrene), poly (styrenebenzoate), or copolymers thereof. Again, the key element is that they must be syndiotactic polymers. Preferred examples of poly(alkylstyrene) include poly (methylstyrene), poly(ethylstyrene), poly(isopropylstyrene). Preferred examples of poly(halogenated styrene) include poly(bromostyrene) and poly(chlorostyrene). Preferred examples of poly(alkoxystyrene) include poly (methoxystyrene) and poly(ethoxystyrene). The most preferred syndiotactic polystyrenes are the un-substituted polystyrene, poly(p-methylstyrene), poly(m-methylstyrene), poly(p-ter-butylstyrene), poly(p-chlorostyrene), and copolymers of styrene and p-methylstyrene. All these polymers, of course, must have high syndiotacticity.

In the present invention, the nucleating agent and the syndiotactic polystyrene resin can be mixed according a variety of known methods. For example, the polystyrene resin can be provided in the form of powder or pellets; it is then mixed with the nucleating agent provided in the powder form. Or the nucleating agent can be initially provided as a concentrated form, and then will be diluted with the polystyrene resin during use. The improved syndiotactic polystyrene composition of the present invention can be processed utilizing also a variety of known techniques, such as extrusion molding, injection molding, vacuum molding, cross-linking foaming, etc. to produce a variety of products, such as fibers, biaxial extension films, thin plates, etc. in addition to molded products. Because of the excellent mechanical and chemical properties of the syndiotactic polystyrenes, the product of the present invention can be most advantageously used in making electronic components and composite materials.

As with many other polymer compositions, a number of other additives can be added to the polystyrene composition. Typical additives include antioxidants and other stabilizers-mainly photo-stabilizers. The antioxidants can be phenol-based antioxidants, organic phosphate-based (including organic phosphate or phosphorous salt) antioxidants, or thioether-based antioxidants. The photo-stabilizers are added mainly to absorb UV light. The inclusion of the phenol- or phosphate-based antioxidants can prevent colorization, and prevent loss of mechanical properties during processing (which involves heat). The amounts of these additives should preferably be about 0.001 to 5 parts, or more preferably 0.01 to 3 parts, per 100 parts of the polystyrene resin. In addition to the antioxidants and photo-stabilizers mentioned above, many other additives may also be included. These include non-ionic, anionic, or cationic anti-static agents, alkali earth salts of aliphatic acids, pigments, dyes, fillers, foaming agents, flame-retardants, lubricants, plasticizers, etc.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

Example 1 (Control Example)

Syndiotactic polystyrene was synthesized in-house at the Union Chemical Lab. The synthesized syndiotactic polystyrene was measured to have a melting point at 269° C. and a syndiotacticity of greater than 95%. A polystyrene mixture was then prepared which contained 100 parts of the syndiotactic polystyrene so prepared, 0.3 parts of Irganox, an anti-oxidant made by Ciba Geigy, and 0.3 pans of U626, another anti-oxidant made by GE Special Chemicals. The polystyrene mixture was extrusion-blended using a CSI MAX mixing extruder, and cut into small polystyrene pellets.

The polystyrene pellets were tested to measure their half-crystallization time ($t_{1/2}$, which is defined as the amount time required for half of the polystyrene mass to become crystalized). The measurement was made using a Perkin Elmer DSC 7 thermal analyzer. During the test, the polystyrene pellets were first heated from room temperature, under a nitrogen environment and at a rate of 10° C. per minute, to 320° C., then maintained at that temperature for 3 minutes. Thereafter, the polystyrene mass was cooled at a rate of 300° C. per minute to 248° C., then maintained at that temperature for 15 minutes. The half-crystallization time, $t_{1/2}$, was recorded when 50% of the polystyrene mass was crystalized. The smaller the half-crystallization time, $t_{1/2}$, the faster the crystallization rate. In this example, which contained no nucleating agent, the half-crystallization time, $t_{1/2}$, was measured to be 4.59 minutes. Results of this example are also summarized in Table 1.

Example 2 (containing 0.5 phr of 2-hydroxybenimidiazole as nucleating agent)

The procedure in Example 2 was identical to that in Example 1, except that the polystyrene composition also contained 0.5 parts, by weight, of 2-hydroxybenimidiazole per 100 parts, also by weight, of polystyrene resin (phr). In this example, the half-crystallization time, $t_{1/2}$, was measured to be 2.62 minutes, indicating an improvement in crystallization rate of about 43%. Results of this example are also summarized in Table 1.

Example 3 (containing 0.3 phr of bis-(phenyl bromide) methane as nucleating agent)

The procedure in Example 3 was identical to that in Example 1, except that the polystyrene composition also contained 0.3 parts of bis-(phenyl bromide) methane per 100 parts of polystyrene resin. In this example, the half-crystallization time, $t_{1/2}$, was measured to be 3.28 minutes, indicating an improvement in crystallization rate of about 29%. Results of this example are also summarized in Table 1.

Example 4 (containing 0.8 phr of bis-(phenyl bromide) methane as nucleating agent)

The procedure in Example 4 was identical to that in Example 1, except that the polystyrene composition also contained 0.8 pans of bis-(phenyl bromide) methane per 100 parts of polystyrene resin. In this example, the half-crystallization time, $t_{1/2}$, was measured to be 3.60 minutes, indicating an improvement in crystallization rate of about 22%. Results of this example are also summarized in Table 1.

Example 5 (containing 0.8 phr of bis-(phenyl bromide) methane as nucleating agent)

The procedure in Example 4 was identical to that in Example 1, except that the polystyrene composition also contained 2.0 pans of bis-(phenyl bromide) methane per 100 parts of polystyrene resin. In this example, the half-crystallization time, $t_{1/2}$, was measured to be 3.27 minutes, indicating an improvement in crystallization rate of about 29%. Results of this example are also summarized in Table 1.

TABLE 1

| Example | Nucleating Agent | Amount (phr) | $t_{1/2}$(min.) |
| --- | --- | --- | --- |
| 1 | none (control) | — | 4.59 |
| 2 | 2-hydroxybenimidiazole | 0.5 | 2.62 |
| 3 | bis(phenyl bromide) methane | 0.3 | 3.28 |
| 4 | bis(phenyl bromide) methane | 0.8 | 3.60 |
| 5 | bis(phenyl bromide) methane | 2.0 | 3.27 |

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A syndiotactic polystyrene composition with improved crystallization rate, comprising:

(a) a syndiotactic polystyrene; and (b) a nucleating agent which is selected from the group consisting of Compounds I and II, which are respectively represented by the following formulas:

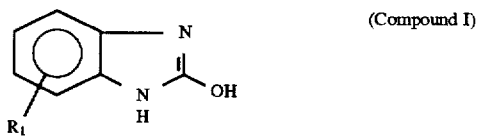

(Compound I)

and

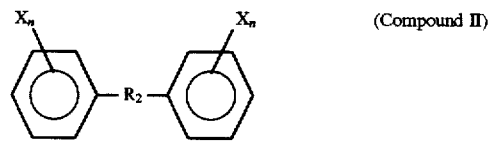

(Compound II)

wherein $R_1$ and $R_2$ are, independently, $C_1$ to $C_5$ alkyl groups, X is a halogen group, and n is an integer from 1 to 5;

(c) further wherein said nucleating agent is provided at 0.01 to 5 part, by weight, per 100 parts, by weight, of said syndiotactic polystyrene.

2. The syndiotactic polystyrene composition disclosed in claim 1 wherein said X a bromide group.

3. The syndiotactic polystyrene composition disclosed in claim 1 wherein said nucleating agent is represented by the following formula:

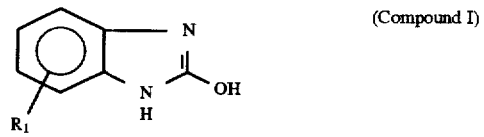

(Compound I)

4. The syndiotactic polystyrene composition disclosed in claim 1 wherein said nucleating agent is represented by the following formula:

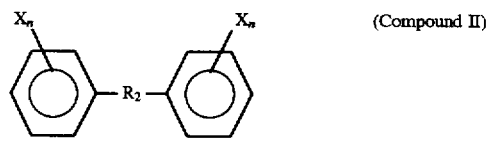

(Compound II)

wherein X is a halogen group, and n is an integer from 1 to 5.

5. The syndiotactic polystyrene composition disclosed in claim 4 wherein said X a bromide group.

6. The syndiotactic polystyrene composition disclosed in claim 1 wherein said nucleating agent is 2-hydroxybenimidiazole.

7. The syndiotactic polystyrene composition disclosed in claim 1 wherein said nucleating agent is bis(phenylbromide) methane.

8. The syndiotactic polystyrene composition disclosed in claim 1 which further comprises an antioxidant selected from the group consisting of phenol-based antioxidants, organic phosphate-based antioxidants, and thioether-based antioxidants.

9. The syndiotactic polystyrene composition disclosed in claim 1 which further comprises UV absorber.

10. The syndiotactic polystyrene composition disclosed in claim 1 which further comprises:

(a) an antioxidant selected from the group consisting of phenol-based antioxidants, organic phosphate-based antioxidants, and thioether-based antioxidants; and (b) a UV absorber.

* * * * *